United States Patent
Marie et al.

(10) Patent No.: US 12,248,202 B2
(45) Date of Patent: Mar. 11, 2025

(54) FILTER FOR EYE CONE CELLS PROTECTION

(71) Applicants: ESSILOR INTERNATIONAL, Charenton-le-Pont (FR); SORBONNE UNIVERSITÉ, Paris (FR)

(72) Inventors: Mélanie Marie, Paris (FR); Serge Picaud, Paris (FR); Valérie Fradot, Paris (FR); José Sahel, Paris (FR); Thierry Villette, Charenton-le-Pont (FR); Coralie Barrau, Charenton-le-Pont (FR); Camille Ehrismann, Charenton-le-Pont (FR)

(73) Assignees: Essilor International, Charenton-le-Pont (FR); Sorbonne Université, Paris (FR)

( * ) Notice: Subject to any disclaimer, the term of this patent is extended or adjusted under 35 U.S.C. 154(b) by 667 days.

(21) Appl. No.: 17/440,101

(22) PCT Filed: Mar. 13, 2020

(86) PCT No.: PCT/EP2020/056984
§ 371 (c)(1),
(2) Date: Sep. 16, 2021

(87) PCT Pub. No.: WO2020/187799
PCT Pub. Date: Sep. 24, 2020

(65) Prior Publication Data
US 2022/0187627 A1    Jun. 16, 2022

(30) Foreign Application Priority Data
Mar. 18, 2019  (EP) .................................. 19305328

(51) Int. Cl.
*G02C 7/10*    (2006.01)

(52) U.S. Cl.
CPC .................................... *G02C 7/10* (2013.01)

(58) Field of Classification Search
USPC ............... 351/159.49, 159.59, 159.6–159.65
See application file for complete search history.

(56) References Cited

U.S. PATENT DOCUMENTS

| 2008/0043200 A1* | 2/2008 | Ishak | ..................... G02C 7/108 427/164 |
| 2010/0149483 A1* | 6/2010 | Chiavetta, III | ....... A61F 2/1659 351/159.63 |

(Continued)

FOREIGN PATENT DOCUMENTS

| CA | 1322678 | 10/1993 |
| FR | 3032283 | 8/2016 |

(Continued)

OTHER PUBLICATIONS

International Search Report and Written Opinion issued in Corresponding PCT Application No. PCT/EP2020/056984, dated May 26, 2020.

(Continued)

*Primary Examiner* — Darryl J Collins
(74) *Attorney, Agent, or Firm* — Norton Rose Fulbright US LLP (57) ABSTRACT

The invention relates to filter dedicated to protect eye cone cells and method associated. The eye cone cells protecting filter is intended to be applied to a transparent surface and to filter incident light for preventing eye cone cells of a user, from damages due to illumination at physiological light levels on the eye of said user, and having spectral characteristics to i) filter light wavelengths between 405 and 465 nanometers, and ii) transmit a filtered light reaching the eye cone cells and having a harmfulness on said eye cone cells under a predefined maximum threshold.

14 Claims, 6 Drawing Sheets

(56) References Cited

U.S. PATENT DOCUMENTS

| | | | | |
|---|---|---|---|---|
| 2012/0008217 A1* | 1/2012 | Ishak | ............... | A61K 8/58 |
| | | | | 359/722 |
| 2015/0002809 A1* | 1/2015 | Cohen-Tannoudji | ............... | |
| | | | | G02C 7/107 |
| | | | | 351/159.63 |
| 2015/0323812 A1* | 11/2015 | Ishak | ............... | G02B 5/208 |
| | | | | 351/159.65 |
| 2016/0017218 A1* | 1/2016 | Kojima | ............... | G02C 7/022 |
| | | | | 252/588 |
| 2017/0038605 A1 | 2/2017 | Lergeton | | |
| 2017/0261768 A1* | 9/2017 | Ambler | ............... | G02B 1/041 |
| 2017/0307906 A1* | 10/2017 | Goldsmith | ............... | G02F 1/13318 |
| 2018/0120592 A1* | 5/2018 | Zhang | ............... | G02C 7/104 |
| 2018/0239170 A1* | 8/2018 | Barrau | ............... | G02B 5/203 |

FOREIGN PATENT DOCUMENTS

| | | |
|---|---|---|
| JP | 2019507388 | 3/2019 |
| KR | 1020170101221 B1 | 9/2017 |
| WO | WO 2015/155748 | 10/2015 |
| WO | WO 2016/107866 | 7/2016 |

OTHER PUBLICATIONS

Zhao et al., "Research progress about the effect and prevention of blue light on eyes" *Int J Ophthalmol* 2018, 11(12), 5 pages.

Office Action issued in corresponding Korean Application No. 10-2021-7028564, dated May 29, 2024, 11 pages (English translation).

\* cited by examiner

FILTER FOR EYE CONE CELLS PROTECTION

CROSS-REFERENCE TO RELATED APPLICATIONS

This application is a national phase application under 35 U.S.C. § 371 of International Application No. PCT/EP2020/056984 filed 13 Mar. 2020, which claims priority to European Patent Application No. 19305328.7 filed 18 Mar. 2019. The entire contents of each of the above-referenced disclosures is specifically incorporated by reference herein without disclaimer.

TECHNICAL FIELD

The invention pertains in general to the field of eye cone cells protecting filter, intended to be applied to a transparent surface such as an eyewear (sunglasses, for example), to filter incident light. Embodiments of the invention relate to a method of determining a configuration for an eye cone cells protecting filter, intended to be applied to at least one transparent surface.

BACKGROUND ART

The electromagnetic spectrum covers a wide range of wavelengths, among which are wavelengths visible to the human eye often referred to as the visible spectrum, covering a range of from 380 nm to 780 nm. Some wavelengths of the electromagnetic spectrum including those of the visible spectrum provide harmful effects, while others are known to have beneficial effects on the eye. Some wavelengths of the visible spectrum are also known to induce a range of Neuroendocrine, physiological and behavioural responses known as non-image-forming (NIF) responses.

The vertebrate retina is a light-sensitive tissue lining the inner surface of the eye. This tissue has four main layers from the choroid to the vitreous humour: the retinal pigment epithelium (hereinafter referred to as "RPE"), the photoreceptor layer (including rods and cones), the inner nuclear layer with bipolar and Muller, amacrine cells, and finally, the ganglion cell layer which contains astrocytes, displaced amacrine cells and retinal ganglion cells with some intrinsically photosensitive ganglion cells (1 to 3% of retinal ganglion cells). This last cell type is important for circadian photo entrainment (biological rhythms) and pupillary function.

Neural signals initiate in the rods and cones, and undergo complex processing by other neurons of the retina. The output from the processing takes the form of action potentials in retinal ganglion cells, the axons of which form the optic nerve. Several important features of visual perception can be traced to the retinal encoding and processing of light.

Photobiology, which is the study of the biological effect of light, has established that a portion of the electromagnetic spectrum provides beneficial effects for good health, including visual perception and circadian functions. However, it has also established the importance of protecting the eyes against harmful radiation, such as ultraviolet (UV) rays. Visible light, even of ordinary everyday intensity, may cause cumulative retinal damage or contribute to the retinal ageing and may be an aggravating factor in the development of early and late age-related maculopathy (ARM), such as Age Related Macular Degeneration (AMD). There are indications in several epidemiological studies that the level of exposure to sunlight may be associated with the development of AMD.

Ophthalmic devices that filter out with low spectral selectivity harmful UV radiations are widely used. For example, the ophthalmic clear lenses are designed to provide UV protection by protecting the eye against the harmful effects of UVA and UVB rays. Intraocular lenses (IOLs) with UV filters were introduced in the 1990s; these being mainly post-cataract surgery implants replacing the crystalline lens.

Blue-light filtering solutions already exist, including day to day protection on clear lenses with blue-violet filtering levels around 20%. But these solutions are based on the research made on the light toxicity onto other retinal cell types (RPE) and most of studies are related to higher toxic irradiance levels. For instance, a previous study on RPE (Arnault et al., 2013, PlosOne) showed that close to 3 times higher light levels were needed to induce strong toxicity on RPE cells in vitro compared to cones in vitro. As an example, around 1.09 $mW/cm^2$ at 440 nm was used to induce 65% damage on primary RPE cells in vitro while only 0.39 $mW/cm^2$ at 440 nm was needed to induce 85% damage on primary cone cells in vitro. Blue-violet light filters have been designed to specifically reduce the transmission of the RPE toxic blue band, namely 415-455 nm, for instance about 20% for the Smart Blue Filter, while ensuring an optimal clarity for a day-to-day use. The existing blue-violet filters are mainly used as clear lenses for a day to day prevention of cumulative retinal damage, but they do not target specific cone protection for which a higher filtering rate is needed.

A filter dedicated to the protection of the RPE can be found in U.S. Pat. No. 8,360,574, EP 2602654, and EP 2602655. Indeed, it is known from the person skilled in the art that blue light can damage the RPE. Nevertheless, the impact of light against the cones was still poorly studied and was associated with the visual pigments, especially to the green light. There was no estimation of the light levels needed to damage the cones.

Technical Problem

Such known solutions are not optimized to protect cone cells against light toxicity and more particularly against blue light toxicity. Recent inventors' studies have shown that blue light damages cone cells by producing a higher mortality of cone cells for lower light irradiances than for RPE. Also, no green light damage was identified, which suggests that light toxicity to cones may be independent of the visual pigment and really located in the blue-violet range for sunlight spectra reaching the retina. Photoreceptors are damaged by light, and this light damage is usually attributed to the activation of the visual pigment.

Moreover, there are not any methods or solutions providing a filter specifically designed and adapted to filter light for cone cell protection. It is sought then for protection against light toxicity especially in cone cell.

Thus, an invention enabling a protection against blue light toxicity against cone cell is necessary regarding the background art.

SUMMARY OF THE INVENTION

The Invention Improves the Situation

The present invention intends to provide an eye cone cells protecting filter, intended to be applied to at least one transparent surface, to filter incident light on said transparent surface, for preventing eye cone cells of a user, from damages due to illumination at physiological light levels on the eye of said user, and having spectral characteristics to:

filter light wavelengths between 405 and 465 nanometers, and transmit a filtered light reaching the eye cone cells and having a harmfulness on said eye cone cells under a predefined maximum threshold.

In this way, the eye cone cells protecting filter may have spectral characteristics comprising a filtering peak between 425 and 445 nm.

Indeed, the light toxicity against eye cone cells reaches its maximum at wavelengths comprised between 425 and 445 nm (explained later).

Because the invention aims at protecting the eye cone cells of a user against light toxicity, the invention needs to be possibly applied in any transparent surface.

The at least one transparent surface may be a transparent surface of glasses, spectacles, sun-glasses, google glasses, virtual reality glasses or even contact lenses, intraocular lenses or ophthalmic medical devices. The at least one transparent surface may be the transparent surface of a window, a windshield, a screen, a rooftop, or any transparent surface which aims at protecting from the outside light. Preferably, the at least one surface is the transparent surface of a glasses. The light reaching the cone cells may be a solar light or any artificial light, as for example light from an electric bulb, neon, a smartphone, a computer or car headlights.

The illumination at physiological light level refers to the real life light user's eye cone cells are exposed to.

The filter may be an active filter or a passive filter, adapted to be applied onto any transparent surface as described before.

As used therein, the term "filter" refers and encompasses the term "eye cone cells protecting filter" and may be whatever a passive or an active filter, unless it is specified the nature of the filter.

The eye cone cells protecting filter may partially cut blue light in the range of wavelengths between 405 and 465 nm, preferably between 425 and 445 nm.

According to an aspect of the present invention, it is provided an eye cone cells protecting filter comprising an active matrix for filtering incident light on said transparent surface, the eye cone cells protecting filter further comprising:

an input for receiving measurements of transmitted light between the transparent surface and the eye, a processor for computing the spectral characteristics of the eye cone cells protecting filter on the basis of at least:

said transmitted light measurements, and said predefined maximum threshold, and for controlling the active matrix to filter incident light on the basis of said computed spectral characteristics.

In this way, the eye cone cells protecting filter may have spectral characteristics comprising a filtering peak between 425 and 445 nm, and the active matrix comprises an electrochromic material.

As used therein, an "active filter" may be a filter which is able to change its filtering spectrum in real time thanks to an active matrix. For example, the active matrix may comprise a chemical composition which reacts with light and so changes its filtering spectrum in regard to the amount of light the active filter receives. The active matrix may also be a chemical composition associated with an electric system which can exchange electrical energy to the chemical composition in order to change the filtering spectrum of the active matrix and therefore adapte in real time the filtering spectrum. Finally, the active matrix may be a filter especially comprising electrical parts which can adjust in real time the filtering spectrum.

For example, the active filter may be a LCD active matrix, a polarized active matrix, and more preferably an active matrix comprising electrochromic material.

According to another aspect of the present invention, it is provided an eye cone cells protecting filter applied as a passive filter, for example the passive filter may be an absorptive filter, dyes, polar filter, MOF, photonic crystal, interferential filter using deposition of high index, low index material, a photochromic lens, a cholesteric layer, or a mix of these solutions.

Preferably, the passive filter may be a darkening tint applied to the transparent surface and configured to absorb a fixed proportion of incident light.

As used therein, a "passive filter" may be a filter which is entirely characterized by its filtering spectrum. Once the passive filter is manufactured, it is not possible anymore to easily change its filtering spectrum.

The eye cone cells protecting filter may be configured to absorb a proportion of incident light higher than 99% at wavelengths below a critical wavelength.

In this way, the critical wavelength may be between 425 and 445 nm.

The predefined maximum threshold may be determined on the basis of at least one element among:

a type of activity of the user (for instance: working, running, swimming, cycling, horsing, hunting, fishing, walking), physiological parameters of the user (for example the person own filtering abilities, weight, tall, form of the eye, frame face form angle, frame shape, lens shape), an age of the user, an average dose of light to which said user is exposed The predefined maximum threshold may be a percentage between 0 and 20%. In a preferred embodiment, no damage on eye cone cells should be tolerated. Thus the predefined maximum threshold should be closed to 0%. The predefined maximum threshold therefore represents harmfulness on eye cone cells induced by a filtered light reaching the eye cone cells to not reach.

Inventor's recent studies show that light having an average irradiance to the corneal surface of 12 $mW/cm^2$ over 400 to 500 nm is already very damaging for cones in vitro, especially for wavelengths between 425 and 445 nm for which the cone cell death is close to 90%.

Figure 7:
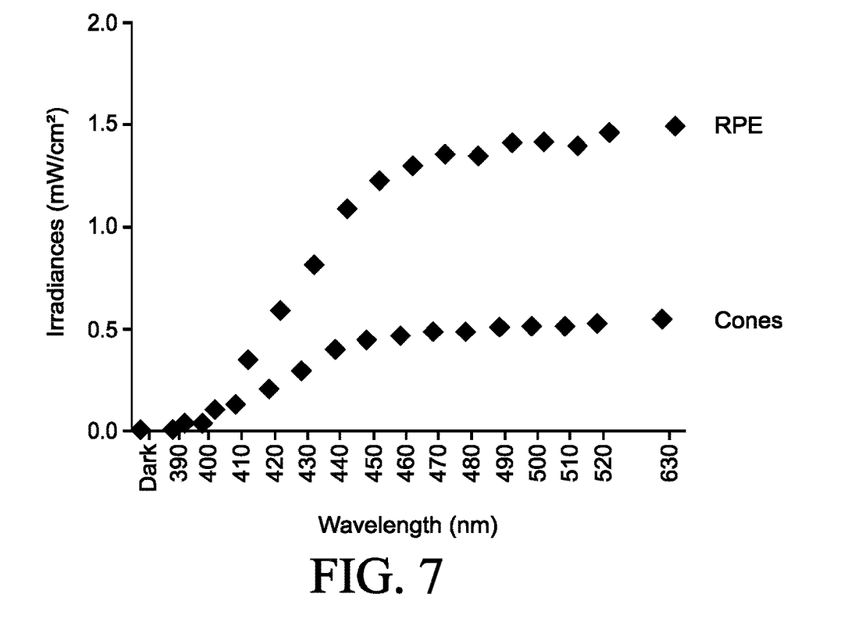
FIG. 7 is a graphic of the irradiances used in vitro to establish the light-induced toxicities for RPE and for cones.

In the graphic of the FIG. 7, two curves illustrates that eye cone cells are more sensitive than RPE cells. The curve RPE has been used to establish the toxicity of light against RPE cells in Arnault et al., 2013, PlosOne. The curve Cones has recently been used to establish toxicity of light on cone cells. At 430 nm for example, it can be seen that toxicity of light is almost three times higher on cones cells than on RPE cells.

In another embodiment, the predefined maximum threshold may be determined as an example according to the average irradiance at the corneal surface over 405 to 465 nm, preferably over 425 to 445 nm, obtained in a typical cloudy winter day in Paris for which the toxicity on cones is not anticipated. The predefined maximum threshold may therefore represent an irradiance threshold a filtered light reaching the eye cone cells must not reach.

More generally, the predefined maximum threshold may be determined further to limit an irradiance to 0.2 $mW/cm^2$ of light reaching the eye cells, preferably the eye cone cells.

In this case, it may be preferred that the eye cone cells protecting filter comprises an active matrix.

Moreover, the present invention intends to provide, in an embodiment where, for example, an active matrix can be used, a method for computing spectral characteristics of an eye cone cells protecting filter, comprising:

a) obtaining, for a solar incident light and within at least one predetermined wavelengths range, a light hazard on cone cells (LHC) defined by a percentage of eye cone cells death relatively to a solar incident light dose, b) measuring an irradiance of a current transmitted light between the transparent surface and the eye, within said predetermined wavelengths range, and estimating, on the basis of said transmitted light measurements, a current cell death hazard percentage, c) if said current cell death hazard percentage is above said predefined maximum threshold, computing said spectral characteristics to lower said measured transmitted light, and repeating b) and c) until the current cell death hazard percentage is below said predefined maximum threshold.

In an embodiment where, for example, a passive filter can be used, it is intended to provide a method for computing spectral characteristics of an eye cone cells protecting filter comprising:

a') obtaining, for a solar incident light and within at least one predetermined wavelengths range, a light hazard on cone cells (LHC) defined by a percentage of eye cone cells death relatively to a solar incident light dose, b') estimating a light dose on the eye, due to user's data, within said predetermined wavelengths range and during a predefined time range, c') estimating, on the basis of said estimated light dose, a current cell death hazard percentage within said given time range, d') if said current cell death hazard percentage is above said predefined maximum threshold, computing said spectral characteristics to lower said current transmitted light until the current cell death hazard percentage is below said predefined maximum threshold.

In either embodiment where an active or a passive filter can be used, said current transmitted light may be determined within a plurality of successive wavelengths ranges, and said current cell death hazard percentage may be given by a sum of current transmitted light irradiance in each of said wavelengths ranges multiplied by said light hazard on cone cells.

In this way, the light hazard on cone cells may be given by a sum of percentages of eye cone cells death relatively to a solar incident light irradiance in each of said successive wavelengths ranges. By solar incident light, it is meant all of the light that can reach the eye, for example diffuse light, reflected light, multi-diffused or multi-reflected light which is added to the light transmitted through the transparent surface, from the transparent surface or other surrounding surfaces.

In the embodiment where, for example but not only an active matrix is used, said spectral characteristics may be given by a light transmission rate Tlens($\lambda$) defined, for each of said successive wavelengths ranges ($\lambda$), by:

Tlens=TH/CD, where:
  TH is the predefined maximum threshold,
  CD is the current cell death hazard percentage, More generally, said percentage of eye cone cells death relatively to a solar incident light irradiance may be obtained in a) for a plurality of successive wavelengths ranges, from tests by calcein staining and during fifteen hours with an irradiance of 0.39 mW/cm$^2$ at 440 nm.

The present invention aims also at a computer program to compute spectral characteristics of an eye cone cells protecting filter in an embodiment where an active matrix is used, the computer program comprising instruction codes for performing a method according to the embodiment where an active lens is used, when the instructions are run by said processor.

Figure 2:
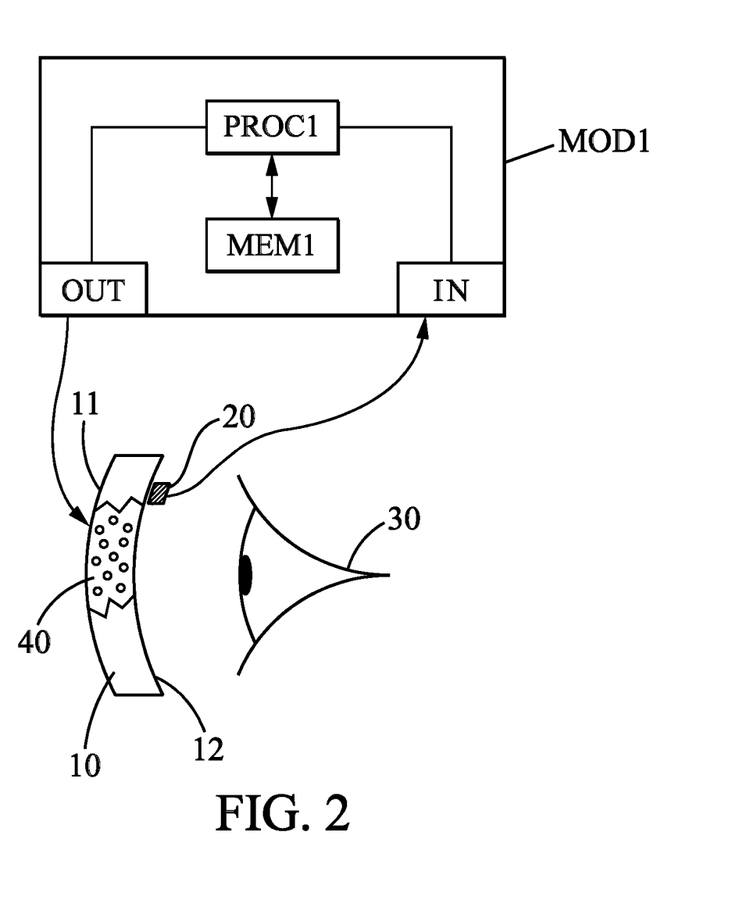
FIG. 2 is a figure of a passive filter applied on a transparent surface.

This first computer program can be executed by a computer module MOD1 connected to an active filter 40 (for example an electrochromic cell) of an active lens as shown in the example of embodiment of FIG. 2. The module MOD1 can include:

an input interface IN to receive environment light data sensed by sensor 20, a processor PROC1, able to cooperate with a memory unit MEM1 storing the first computer program (and also at least the aforesaid user data, from which thresholds can be calculated), so as to execute this first computer program and process then data received from sensor 20, to send control signals to an output interface OUT to control the active filter 40.

Therefore, the present invention aims also at a device comprising the computer module MOD1 to implement the method according to the embodiment where an active matrix is used.

The present invention aims also at another computer program to compute spectral characteristics of an eye cone cells protecting filter in an embodiment where a passive filter is used, the computer program comprising instruction codes for performing a method according to the embodiment where a passive lens is used, when the instructions are run by said processor.

Figure 10:
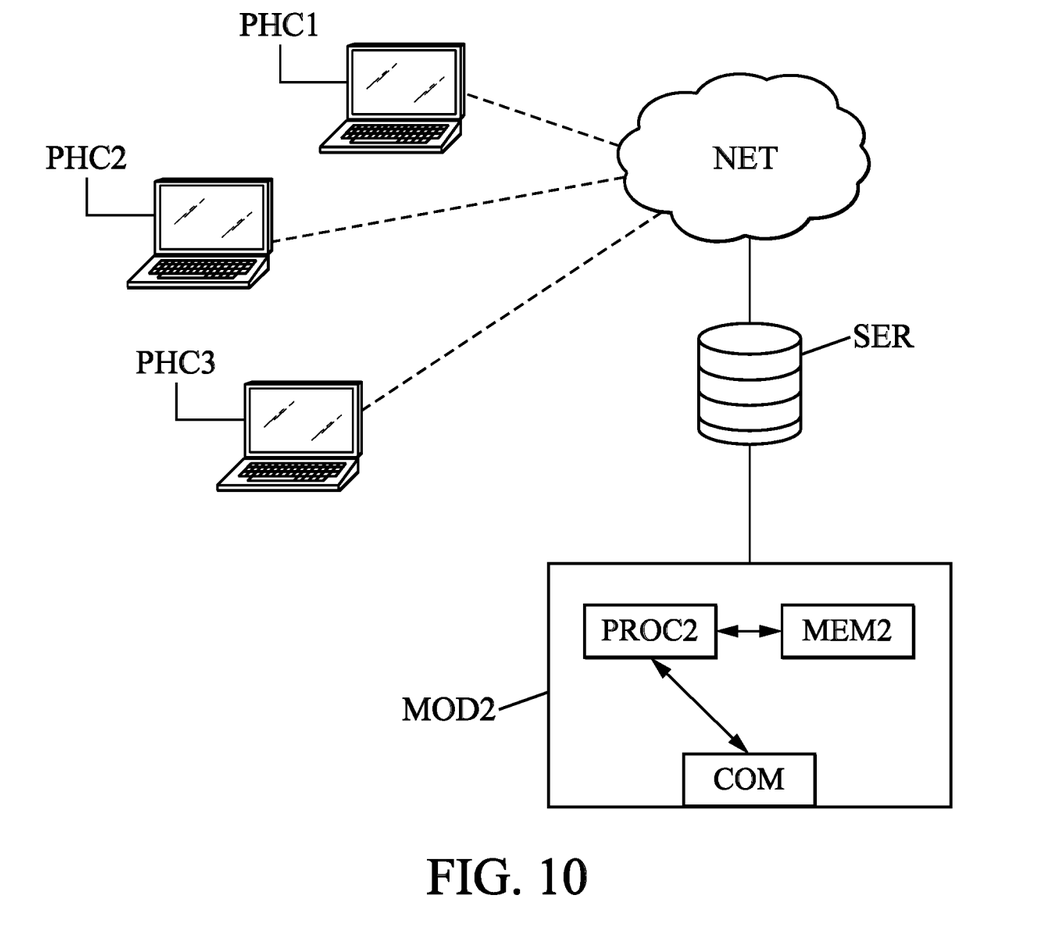
FIG. 10 is an organigram of a network enabling to provide an eye cone cells filter to a user according to an embodiment of the present invention.

This second computer program can be executed by a computer module MOD2 of a server SER (as shown in FIG. 10) connected via a network NET to computer devices of professional healthcare PCH1, PCH2, . . . , which send user data of a future wearer to the server SER. The module MOD2 of server SER can include:

a communication interface COM to receive user data, a processor PROC2, able to cooperate with a memory unit MEM2 storing the second computer program, so as to execute this second computer program and process then user data received from interface COM, to calculate spectral characteristics of a passive filter intended to passive lens to be worn by this user, according to the embodiment where passive lenses is used.

The present invention then aims also at a server comprising a computer module MOD2 so as to implement the method according to the embodiment where a passive lens is used.

Solution to Problem

Thus, the present invention makes it possible to provide an eye cone cells protecting filter dedicated to eye cone cell protection. Indeed, the present invention discloses a method which provides a filter with a filtering spectrum considering environment light and a user's activities and pathology in order to protect said user cone cells against blue light toxicity, even in low light conditions. Moreover, the present invention takes into account the fact that cone cells are more sensitive than RPE, and therefore need a dedicated protection among specific wavelengths and under specific intensity of light threshold and with higher filtering level than prior arts filter provided.

Also, disclosure of this document concerns isolated cone cells which do not present in any case an aging model. Consequently, disclosures of the present document may concern any user of any age. Particularly, disclosures of the present document may concern people and children with a genetic mutation causing degeneration of cones (retinal dystrophies).

BRIEF DESCRIPTION OF FIGURES

Other features, details and advantages will be shown in the following detailed description and on the figures, on which.

DESCRIPTION OF EMBODIMENTS

The Active and Passive Filters

As used herein, the eye cone cells protecting filter selectively inhibits a range of wavelengths if it inhibits at least some transmission of wavelengths within the range, while having little or no effect on the transmission of visible wavelengths outside the range, unless specifically configured to do so. The term "rejection rate" or "inhibition rate" or "degree of inhibition" or "filtering rate" refers to the percentage of incident light within one or more selected ranges of wavelengths which are prevented from being transmitted. On the contrary, the term "transmission rate" refers to the percentage of light which is actually being transmitted. As an example, a transmission rate of 0% means that no light is being transmitted by the filter, and the corresponding inhibition rate is therefore 100%, all of the light arriving into the filter is stopped, absorbed, diffused or reflected. The parameter range of wavelengths or bandwidth is defined as the Full Width at Half Maximum (FWHM).

The filter is defined thanks to its "filtering spectrum" or, within the same meaning "spectral characteristics". As used therein, the term "filtering spectrum" or "spectral characteristics" refers to the transmission rate of the filter according to a plurality of wavelengths ranges.

Figure 3:
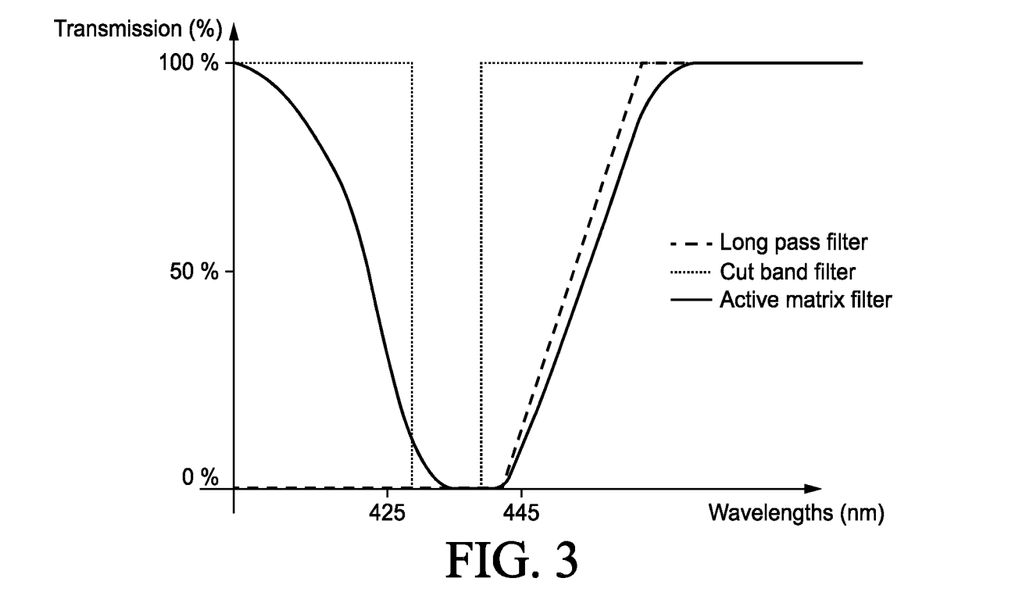
FIG. 3 is a graphic of three different filtering spectra of three different eye cone cells protecting filters according to an embodiment of the invention.

It is now referred to FIG. 3. Three filtering spectra are illustrated. One corresponds to an active matrix filtering spectrum, another corresponds to a bandstop filtering spectrum and another corresponds to a longpass filtering spectrum. All of the filtering spectra are characterized in that they comprise a filtering peak between 405 and 465 nm, preferably between 425 and 445 nm.

A filter called a "longpass filter" is configured to absorb a proportion of incident light higher than 30%, preferably higher than 50%, preferably higher than 90% and preferably higher than 99%, at wavelengths below a critical wavelength, said critical wavelength being selected from 405 to 465 nm, preferably from 425 to 445 nm.

The longpass filter is characterized by its ability to absorb light; this ability can also be expressed in Optical Density (OD). The Optical Density is the decimal logarithm of the transmission. For example, OD2 means that 99% of light is absorbed by the filter.

A filter called a "bandstop filter" is configured to cut a proportion of incident light higher than 30%, preferably higher than 50%, preferably higher than 90% and preferably higher than 99%, at a band of wavelengths comprised between 405 to 465 nm and preferably from 425 to 445 nm.

The filtering spectrum of an "active matrix filter" is characterized by its ability to follow the toxicity curve, preferably in a dynamic way. It can cut a proportion of incident light higher than 30%, preferably higher than 50%, preferably higher than 90%, and preferably higher than 99% at specific wavelengths, The cutting ratio may be further customized according to various parameters:
- the pupil size, for example the product of the cutting ratio multiplied with the pupil size may be custom-adjusted, for example said product may be constant,
- the environment (more or less luminous) and activities of the user (for example sport activities, working, driving),
- a predefined maximum threshold.

Color balancing may also be provided to the eye cone protecting filter to reduce, for example the Yellow index Y1.

Figure 1:
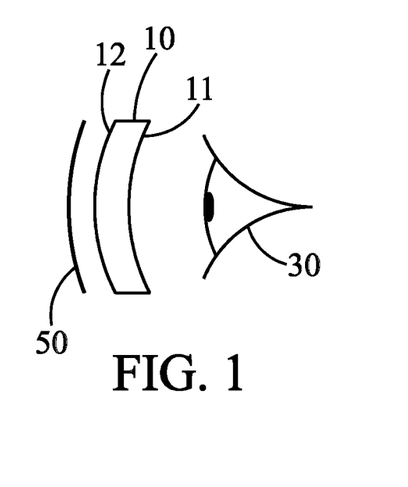
FIG. 1 is a figure of an active matrix applied on a transparent surface according to an embodiment of the invention.

It is now referred to FIG. 1. According to an embodiment of the present invention, the filter may be a passive filter. Said passive filter may be a longpass or bandstop filter. Preferably, the passive filter may be a darkening tint 50 having a transmission rate being equal or less than 10%, and preferably equal or less than 1%. The darkening tint 50 may be applied onto a transparent surface 10 of a lens, the lens being in front of an eye 30.

The darkening tint 50 may be applied into the outer surface 12, or into the inner surface 12, or in between these two extreme surfaces. Referring to the FIG. 1, the darkening tint 50 is applied onto the outer surface 11.

The darkening tint 50 may be provided in order to obtain a light reaching the eye under a predefined maximum threshold.

It is now referred to FIG. 2. According to another embodiment of the present invention, the eye cone cells protecting filter may be an active filter, preferably an active matrix 40 applied into the outer surface 12, or into the inner surface 12, or in between these two extreme surfaces. Referring to the FIG. 2, the active matrix 40 is applied in between the inner surface 12 and the outer surface 11.

The eye cone cells protecting filter may further comprise a sensor 20. The sensor 20 may be a power meter, a LCD cell, a diode, an assembly of said elements or any sensor which enables to convert a light signal into an electrical signal. Preferably, the sensor 20 may be an assembly of diodes converting a light signal from 405 to 465 nm, preferably from 425 to 445 nm, by 1 to 20 nm wavelengths steps, preferably by a 10 nm wavelength step. Thus, the sensor 20 may measure the irradiance of light which said user is exposed to, preferably in the form of a light spectrum. Such measurements of physiological light are shown in the table 5 of the example 1.

The sensor 20 may be applied between the transparent surface 10 and the eye 30, and preferably between the inner surface 11 and the eye 30. Also, the sensor may be applied onto the user's eyewear.

The eye cone cells protecting filter may further comprise a memory MEM1. The memory MEM1 may be dedicated to store information as Light Hazard on Cone cells, predefined threshold or user's data. The memory MEM1 may be applied onto an eyewear.

Light Hazard on Cone Cells (LHC)

As used therein, the term "Light Hazard on Cone" (LHC), expressed in a percentage multiplied with a surface and divided by a dose of light, is the percentage of "toxicity on cone cells" regarding the "dose of light", wherein the light is a referenced light, preferably a referenced solar light and preferably a D65 light, defined for successive wavelengths ranges for an exposure time of 15 hours.

LHC is calculated considering the measured toxicity on cones cells and the corresponding dose on cone cells according to the equation Math. 1.

$$LHC = \int ToC(\lambda)/D_R(\lambda) d\lambda \quad [\text{Math. 1}]$$

Where, ToC is Toxicity on cone cells and $D_R$ is the dose of light received by the cone cells which have been irradiated.

As used therein, the "toxicity on cone cells" is the difference between 100% and the percentage of viable cone cells. Percentage of viable cone cells may be for example obtained thanks to fluorescence on cone cells, for example by calcein staining. For a plurality of wavelengths ranges and for a test duration of several hours, preferably 15 hours, a group of $N_i$ cone cells is irradiated by a referenced light, meanwhile another group of $N_0$ cone cells is not irradiated, for example by being placed in the dark. Cone cells of both groups which react positively to the calcein stain are considered as viable. Thus, a number $V_i$ of viable cone cells irradiated by a referenced light and a number $V_0$ of viable cone cells not irradiated are obtained.

The number $V_i$ of viable cone cells irradiated by a referenced light is further normalized by the number $V_0$ of viable cone cells in dark control condition. The toxicity on cone cells, expressed in percentage is finally obtained thanks to the equation Math. 2 below.

$$ToC = 1 - \frac{V_i}{V_0} \quad [\text{Math. 2}]$$

Where ToC is the toxicity on cone cells expressed in a percentage (%); $V_i$ is the number of viable cone cells irradiated by a referenced light and $V_0$ is the number of viable cone cells not irradiated.

Figure 6:
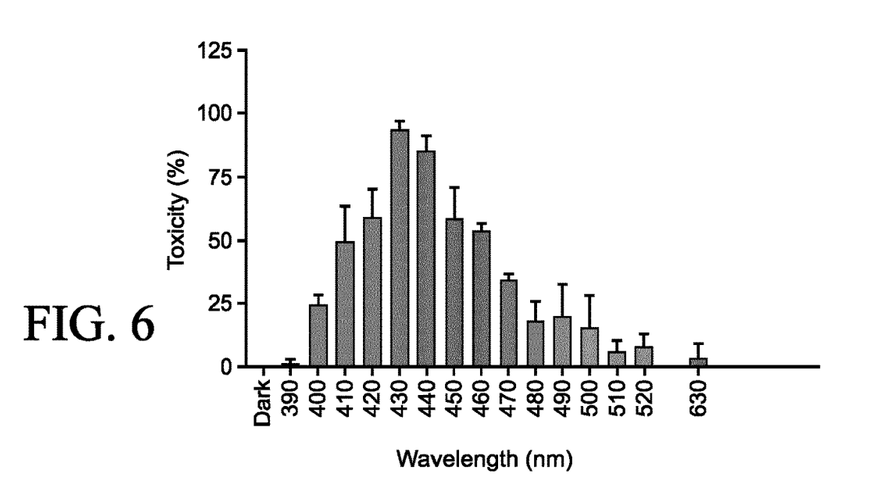
FIG. 6 is the toxic action spectrum of light onto primary eye cone cells established in vitro after normalizing the irradiance levels of each 10-nm light band to the solar spectrum reaching the retina.

It is now referred to FIG. 6. This graphic shows the toxicity on eye cone cells Wavelengths comprised between 400 and 470 nm show the highest toxicity values.

A used herein, the "dose of light" or "energy" corresponds to a power, expressed in Watt (W) or milliwatt (mW), multiplied with a time, expressed in hours (h), minutes (min) or seconds (s), preferably the dose of light is expressed in milliWatt multiplied with hours (mW·h), as illustrated by the equation of Math. 2.

$$D_R(\lambda) = I_R(\lambda) * t \quad [\text{Math. 2}]$$

Where $I_R$ is the irradiance of referenced light received by the cone cells being irradiated; and t is a time expressed in seconds, minutes or preferably hours.

Current Cell Death Hazard (CD)

The eye cone cells protecting filter, when an active filter is used, may further comprise a computer module MOD1 in order to compute the equations described above and further equations that will be now described.

The computer module MOD1 may comprise a processor PROC1, a memory MEM, inputs and outputs IN/OUT may be part of a computer module MOD1 adapted onto an eyewear and able to communicate with the sensor 20 and the active matrix 40.

The processor PROC1 may receive inputs IN from the sensor 20 and/or from the memory MEM1 via an electrical wire or a wireless communication, Bluetooth, WiFi, NPC. Particularly, the processor PROC1 may receive from the sensor 20 a current light spectrum and the processor may receive from the memory MEM1 user's data and LHC values.

The processor PROC1 may be able to calculate the "current cell death hazard" or "Cell death" (CD) induced by light which said user is exposed to. The Cell death corresponds to the harmfulness of the light reaching the eye cone cells, filtered or not. Regarding this current cell death and the user's data and the predefined threshold, the processor PROC1 may be able to compute the filtering characteristics to the active matrix 40 via output instructions OUT. Indeed, the processor PROC1 may send outputs OUT to the active matrix thanks to an electrical wire or a wireless communication.

A used therein, the term "current cell death hazard" or "Cell death" (CD) refers to the measure of the toxicity on cone cells produced by a current light transmitted to the eye compared with the LHC. The current cell death hazard is further calculated according to the equation Math. 4.

$$CD = \iint D(\lambda,t) \cdot LHC(\lambda) T_{lens}(\lambda) \cdot d\lambda \cdot dt \quad [\text{Math. 4}]$$

Where CD is the Cell death, expressed in percentage from 0 to 100%; D is the dose of light received by the cone cells in real life, taking into account the eye transmittance and an estimation or the measurement of the real life light exposure to the user. Said spectral eye transmittance is expressed as a percentage between 0 and 100% and is defined by the Commission Internationale de l'eclairage (CIE, 2012) and depends on age; LHC is the light Hazard on Cone cells function; $T_{lens}$ is the current filtering spectrum of the filter. If no filter is provided onto the transparent surface, then $T_{lens} = 1$.

The processor PROC1 may also compute a cell toxicity reduction ratio comparing the cell death calculated considering the filtering characteristics or considering any eye cone cells protecting filter. The cell toxicity reduction ratio is further calculated according to the following equation Math. 5.

$$Ratio = 1 - \frac{CD_{Lens} - TH}{CD_0} \quad [\text{Math. 5}]$$

Where $CD_{Lens}$ is the cell death obtained with a filter;
TH is the predefined maximum threshold;
and $CD_0$ is the cell death calculated for $T_{lens}=1$.

The Passive Method

The present invention also refers to methods which enable to choose a filter and adapt the filtering characteristics of said filter regarding the LHC and a calculated or estimated cell death hazard percentage.

Figure 4:
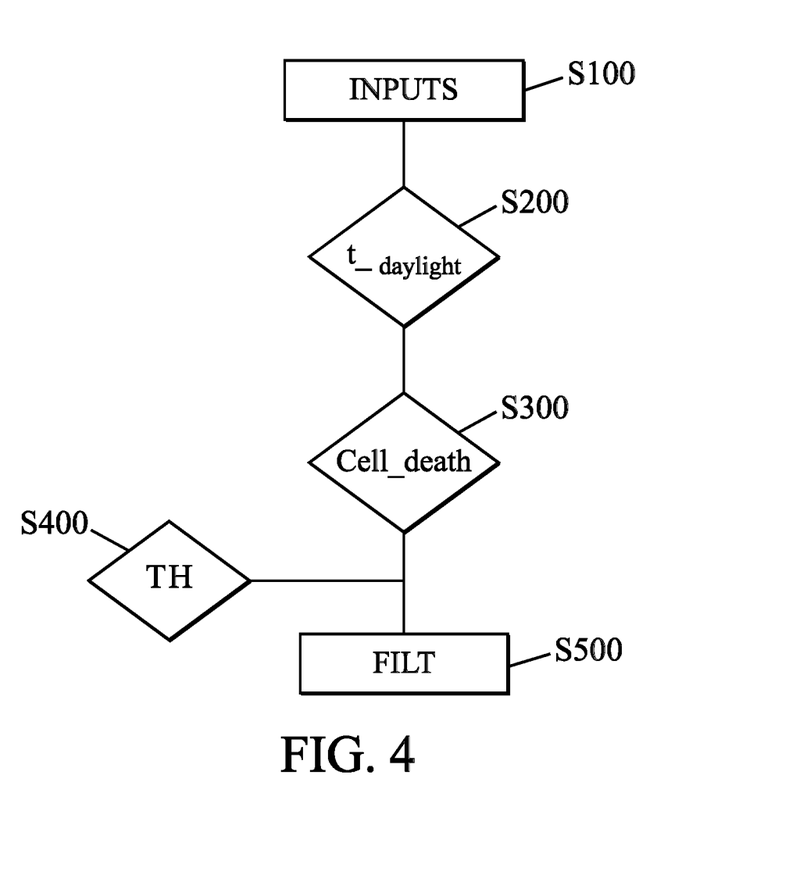
FIG. 4 is a diagram illustrating the method for computing spectral characteristics of an eye cone cells protecting filter according to an embodiment of the invention where an active matrix is used.

It is now referred to FIG. 4. T The figure illustrates the method further associated to the embodiment where a passive matrix is used. A method for determining the configuration of one or more eye protecting passive filter based on a user's data associated with a specific environment will now be described.

In a first step S100, a processor PROC2 considers the user's data, the predefined maximum threshold TH and the LHC. User's data, TH and LHC are stored in a memory.

In a second step S200, according to the user's data averaged for one week, and more particularly to the exposure of the user's location and his activity, exposure duration to light ($t_{daylight}$) is calculated. This duration may be expressed in days (d), hours (h), minutes (min) or second (s).

In a third step S300, the cell death according to the exposure duration to light is estimated. The equation enabling this calculation is described in equation Math. 6 below:

$$CD_{S3} = \iint D_{S3}(\lambda,t) \cdot LHC(\lambda) \cdot d\lambda \cdot dt \quad \text{[Math. 6]}$$

Where $CD_{S3}$ is the cell death calculated in S300; $D_{S3}$ is the estimated dose of light received by the cone cells, taking into account the eye transmittance. Said eye transmittance is expressed as a percentage between 0 and 100% and is defined by the CIE and depends on age;
LHC is the light Hazard on Cone cells function;

More particularly, in the step S300, the Dose is calculated considering the light spectrum of a referenced sun light, preferably D65 referenced sun light, and the time considered is the exposure duration to light (tdaylight).

In a fourth step S400, the calculated cell death (CD) is compared to the predefined maximum threshold.
If CD<TH, then no eye cone cells protecting filter is provided
If TH<CD<a·TH, then there is a need for a cone protection. The passive filter may be a longpass or band stop filter.
If CD>a·TH, then there is a strong need for a cone protection. The passive filter may be a longpass filter, preferably a darkening tint characterized in that the darkening tint has an Optical Density of at least 1, where "a" is a real positive number chosen according to user's data;

The parameter a may be operated in accordance to the user's activity, physiological parameters of the user, an age of the user, an average dose of light to which said user is exposed to. For instance, if the user works every day on a computer, the parameter a may be decreased so as to decrease the predefined maximum threshold. On the contrary, if the user is more often working by night, the parameter a may be slightly increased so as to slightly increase the predefined maximum threshold.

In a final step S500, the filter characteristics are implemented for manufacturing the optimized passive filter.

The Active Method

Figure 5:
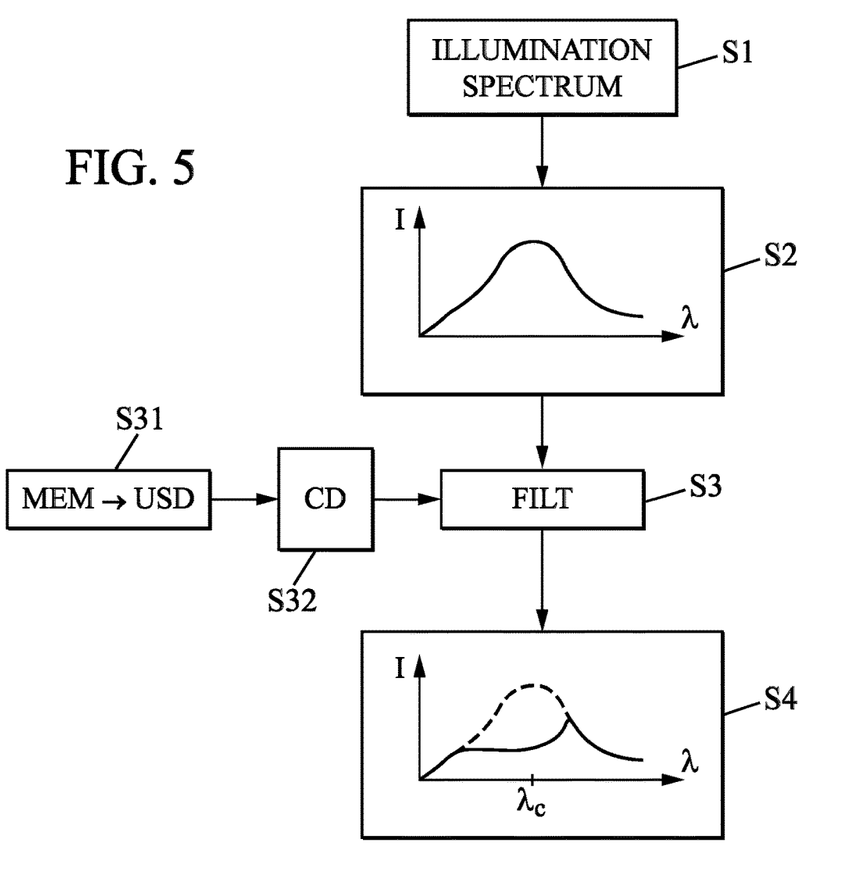
FIG. 5 is a diagram illustrating the method for computing spectral characteristics of an eye cone cells protecting filter according to an embodiment of the invention where a passive filter is used.

It is now referred to FIG. 5. The figure illustrates the method further associated to the embodiment where an active matrix is used. A method for determining the configuration of one or more eye protecting active filter based on a particular user associated with a particular environment will now be described.

In an initial step S1, the sensor 20 measures the light it received. Thus, the sensor 20 measures the irradiance of light which said user is exposed to, preferably in the form of a light spectrum, by converting a light signal into an electrical signal. The light spectrum refers to the environment of the user.

In a second step S2, the processor PROC1 computes this light spectrum and considers the specific wavelengths ranges from 405 to 465 nm, and preferably from 425 to 445 nm.

In a first substep S31, the processor reads from the memory MEM1 the user's data (USD), the LHC and the predefined maximum threshold;

In a second substep S32, the processor PROC1 calculates the cell death induced by the measured light spectrum, considering the LHC, according to the equation Math. 4. If the measured cell death (CD) is lower than TH, then no eye cone cells protecting filter is required for the user. If the measured cell death is higher than TH, the step S3 is initiated.

In a step S3, the processor PROC1 computes filtering characteristics to the active matrix. Filtering characteristics are based on user's data and cell death regarding TH. For example, for every wavelengths range, if cell death is higher than TH, then the transmission ratio of the active matrix is TH divided by the cell death CD. However, considering the user's data, it could be preferable for the user to lower certain specific wavelength. Thus, for every wavelengths range, a coefficient (a), regarding the user's data can be added. Thus, the transmission ratio is calculated according to the equation Math. 7 below:

$$T_{Lens,\lambda} < a \cdot \frac{TH_\lambda}{CD_\lambda} \quad \text{[Math. 7]}$$

Where, $T_{Lens,\lambda}$ is the transmission rate of the active matrix for a specific wavelength range;
TH is the predefined maximum threshold;
$CD_\lambda$ is the cell death for the specific wavelength range.

The parameter a may be operated in accordance to the user's activity, physiological parameters of the user, an age of the user, an average dose of light to which said user is exposed to. For instance, if the user works every day on a computer, the parameter a may be decreased so as to decrease the predefined maximum threshold. On the contrary, if the user is more often working by night, the parameter a may be slightly increased so as to slightly increase the predefined maximum threshold.

In a final step S4, the cell death (CD2) is again calculated considering the $T_{Lens}$, according to the equation Math. 4. If the CD2 is still higher than TH, the transmission rate of the filtering characteristics of the active matrix is enhanced, for example the transmission rate decreases by 1, 2, 3, 4 or 5%.

The Computation Method

It is now referred to FIG. 10 where the method illustrated in FIG. 4 is implemented into a computer module MOD2.

The computer module MOD2 comprises at least a memory MEM2, a processor PROC2 and a communication module COM. The computer module MOD2 may be connected to a server SER. The server SER may be connected to the computer module MOD2 and to a network NET. The network may be able to communicate with professional healthcare computer PHC1, PHC2, PHC3.

The professional healthcare, for example optician, ophthalmologist, nurse or doctor may enter into their computer the user's data and preferences, as described above. These data may transit throw the network NET and stored into the server SER.

Also, in an embodiment where a personalized google is used, the corneal and lens transparency could be measured for individual patients and introduced in the computer calculation so that one person has its specific goggle tuned for his transparency Starting from these data stored in the server SER, the processor PROC2 may compute these data according to the method described above and illustrated in the FIG. 4, in order to determine filter characteristics regarding a predefined maximum threshold.

It is then possible to store the filtering characteristics into the memory MEM2. Filtering characteristics may be communicated via a communication module COM to, for example a manufacturer in order to provide the adapted filter. The adaptive filter is for example a darkening tint having sufficient optical density in order to transmit a light having harmfulness under a predefined threshold.

EXAMPLES

Eye Cone Cells Viability

Figure 8:
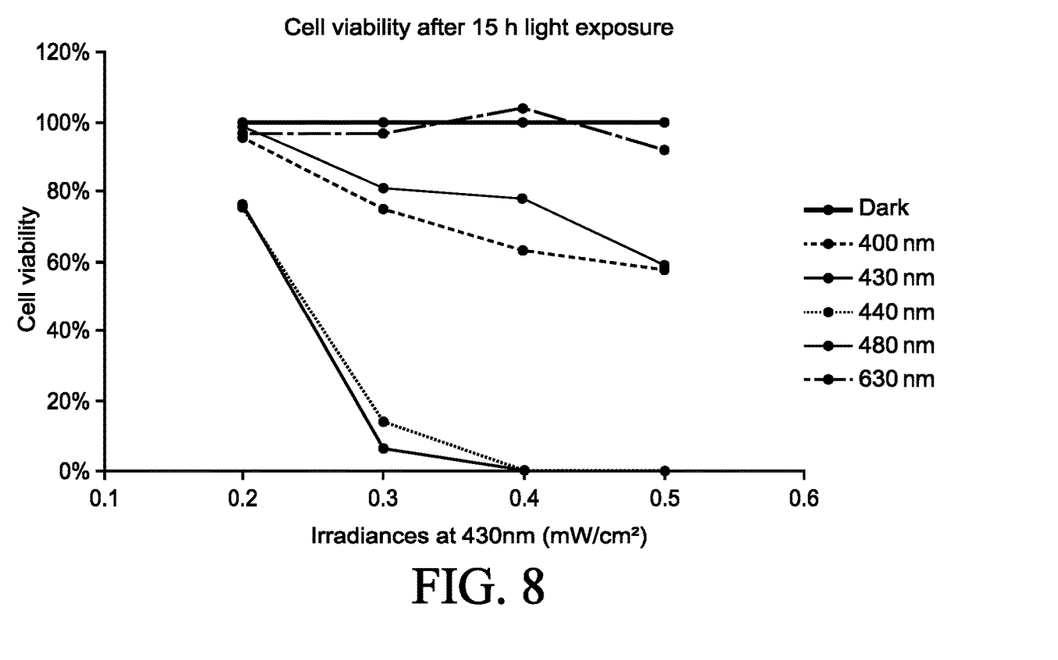
FIG. 8 is a graphic of cone cell viability regarding different wavelengths at several irradiances.

It now referred to FIG. 8. This graphic shows the eye cone cells viability for several irradiances at several wavelengths. Particularly, the eye cone cells viability falls to almost 0% at wavelengths comprised between 400 and 430 nm and irradiances greater than 0.3 mW/cm$^2$. Irradiances and wavelengths considered for this graphic are gathered into the table 1 below.

TABLE 1

| Irradiances corresponding to different wavelength ranges (mW/cm$^2$) | | | | |
|---|---|---|---|---|
| Dark | 0 | 0 | 0 | 0 |
| 400 nm | 0.03 | 0.04 | 0.05 | 0.07 |
| 430 nm | 0.2 | 0.3 | 0.4 | 0.5 |
| 440 nm | 0.27 | 0.39 | 0.53 | 0.66 |
| 480 nm | 0.35 | 0.56 | 0.66 | 0.83 |
| 630 nm | 0.35 | 0.56 | 0.69 | 0.73 |

Figure 9:
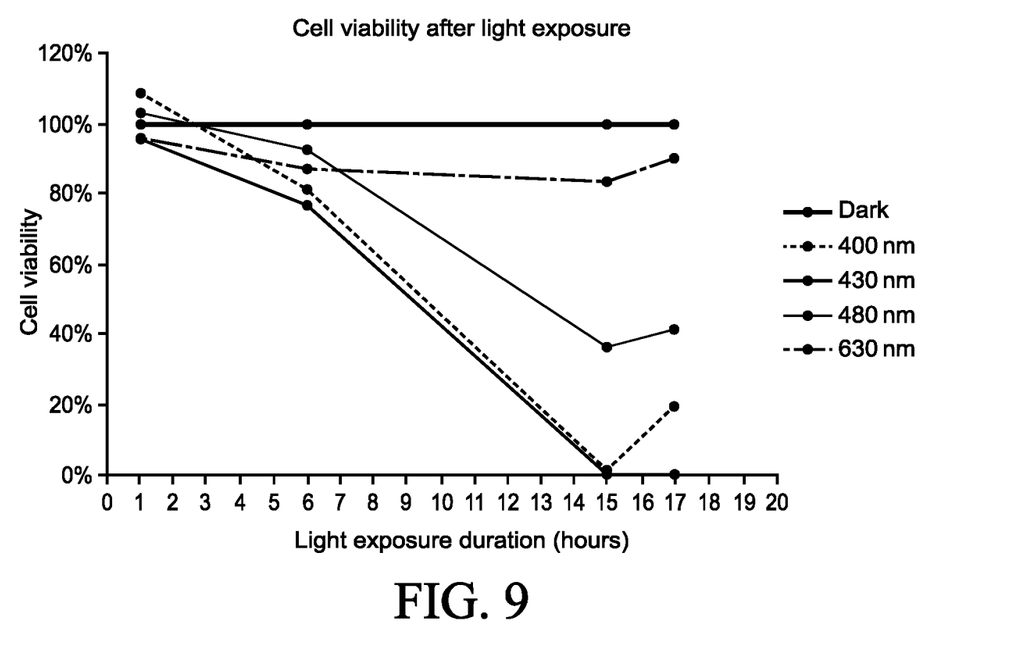
FIG. 9 is a graphic of cone cell viability regarding different wavelengths at several irradiances for different light exposure duration.

It is now referred to FIG. 9. This graphic shows the influence of light exposure duration against eye cone cells. It appears that more the eye cone cells are exposed and more the cell viability is impacted and falls to almost 0%. The light spectrum considered is defined in the table 2 below.

TABLE 2

| Light spectrum | |
|---|---|
| Dark | 0 |
| 400 nm | 0.11 |
| 430 nm | 0.81 |
| 480 nm | 1.32 |
| 630 nm | 1.7 |

Calculation of the LHC and Cone Cell Death

It is now referred to the Table 3. The toxicity on cone cells disclosed below corresponds to the toxicity obtained on isolated primary cones illuminated in vitro with a solar spectrum (D65) after taking into account the natural filtering of the anterior eye media during 15 h with an irradiance of 0.3 mW/cm$^2$ at 430 nm, from 390 to 520 nm with a 10 nm step, and for 630 nm, as a comparison between a red light (considered at 630 nm).

TABLE 3

| wavelentgh (nm) | Toxicity on cone cells (%) | irradiance on cone cells (mW/cm$^2$) |
|---|---|---|
| 390 | 0 | 0.01 |
| 400 | 25 | 0.04 |
| 410 | 50 | 0.13 |
| 420 | 60 | 0.22 |
| 430 | 90 | 0.31 |
| 440 | 85 | 0.39 |
| 450 | 60 | 0.48 |
| 460 | 55 | 0.44 |
| 470 | 40 | 0.45 |
| 480 | 15 | 0.56 |
| 490 | 15 | 0.54 |
| 500 | 15 | 0.51 |
| 510 | 50 | 0.5 |
| 520 | 50 | 0.69 |
| 630 | 0 | 0.56 |

A moderate irradiance of 0.39 mW/cm$^2$ used at 440 nm+/−5 nm on primary cones in vitro roughly corresponds to an irradiance of 0.93 mW/cm$^2$ received on the corneal surface for a 40-year-old person.

In a sunny morning in Paris during the summer, the irradiance level can reach 0.46 mW/cm$^2$ at 440 nm+/−5 nm when pointing a calibrated spectroradiometer downward towards the ground from the fifth floor of a building. Already over this very narrow band (440 nm+/−5 nm), the irradiance used in vitro was only 2-fold the irradiance measured in real life in a very bright Paris morning. Therefore, even in Paris, a pedestrian could encounter toxic blue light levels on a sunny summer day. Fortunately, he may not be exposed for 15 consecutive hours but cumulative effect over a week could be observed because mitochondrial renewal is not finalized in a day. Finally, increasing further the light level in more exposed countries, by watching the sky, when exposed to a very reflective ground such as snow or clouds, will reduce the time required to induce the lesions. This photosensitization of cone photoreceptors could easily explain visual impairment caused by a few minutes of direct watching in the sun's direction as during solar eclipses or by indirect desert ground reflection. It could also accelerate the degenerative process in the context of retinal dystrophies showing greater sensitivity to oxidative stress.

It is now referred to the table 4. Values of LHC are presented depending on their wavelengths.

TABLE 4

| Wavelentgh (nm) | Light Hazard on Cones (LHC) [%/(mW · h/cm$^2$)] for 15 hours |
|---|---|
| 390 | 0 |
| 400 | 42 |
| 410 | 26 |
| 420 | 18 |
| 430 | 19 |
| 440 | 15 |
| 450 | 8 |
| 460 | 8 |
| 470 | 6 |
| 480 | 2 |
| 490 | 2 |
| 500 | 2 |
| 510 | 7 |
| 520 | 5 |
| 630 | 0 |

Preferably, the LHC is memorized into a memory. LHC may enable to be further computed by a processor.

The objective is now to estimate the real life toxicity on cones induced by daylight exposure. It may be considered that the light dose received by the eye needs to be calculated over 1 week for example.

Two variables are defined:

the time under daylight exposure during 1 week, $t_{daylight}$ (h). This variable can vary between 10 to 50 hours.

the predefined maximum threshold (TH), expressed in a percentage. Below this predefined maximum threshold, the light can be considered as nontoxic for eye cone cells.

Daylight exposure has been assessed in multiple light conditions, averaged for one year considering at least time of day and time of year, weather, "eye" orientation, surroundings (for example the fifth floor with a clear view or a first floor in a street with high buildings).

Thus, it is possible to calculate real life light doses received by the ocular surface of the eye (DOSE_eye surface) for the chosen $t_{daylight}$, for example, from a cloudy day in winter to a very sunny afternoon with a clear view in summer.

The eye transmittances ($T_{eye}$, expressed in a percentage) is taken into account to have the best estimation of the light dose received by the cones. Said eye transmittances are defined by CIE (for example CIE 203:2012) and depend on age. Here, the calculations have been made for a 40 years old eye.

The current transmitted light spectrum corresponds to the spectrum of the light at physiological light levels. It is the real life daylight exposure, which will enable to calculate toxicity on cone cells. For instance, if the user is driving a car, the current light spectrum would correspond to the sun spectrum, altered with flash lights and windshield transmission rate.

The table 5 is an example of a current transmitted light spectrum, considering the ocular transmission of a 40 years old user. The current transmitted light spectrum is either measured by the sensor 20 or deduced by user's data.

TABLE 5

| Wavelentgh (nm) | Ocular transmission (%) | current transmitted light (mW/cm²) |
|---|---|---|
| 390 | 0 | 0.128 |
| 400 | 2 | 0.197 |
| 410 | 7 | 0.245 |
| 420 | 18 | 0.255 |
| 430 | 32 | 0.256 |
| 440 | 42 | 0.309 |
| 450 | 48 | 0.352 |
| 460 | 53 | 0.375 |
| 470 | 56 | 0.391 |
| 480 | 59 | 0.394 |
| 490 | 62 | 0.381 |
| 500 | 65 | 0.407 |
| 510 | 67 | 0.401 |
| 520 | 69 | 0.406 |
| 630 | 81 | 0.406 |

The exposure duration to light ($t_{daylight}$) is considered regarding user's data. In this example, $t_{daylight}$=50 h. Consequently, the dose can be calculated multiplying the current transmitted light with the $t_{daylight}$, as illustrated in table 6.

TABLE 6

| Wavelentgh (nm) | Dose (mW · h/cm²) |
|---|---|
| 390 | 6.44 |
| 400 | 9.84 |
| 410 | 12.27 |
| 420 | 12.76 |
| 430 | 12.85 |
| 440 | 15.43 |
| 450 | 17.62 |
| 460 | 18.75 |
| 470 | 19.55 |
| 480 | 19.72 |
| 490 | 19.04 |
| 500 | 20.36 |
| 510 | 20.01 |
| 520 | 20.29 |
| 630 | 20.31 |

Cone cell death is then calculated thanks to the equation Math. 6. The table 7 just below regroups the values of cone cell death.

TABLE 7

| Wavelentgh (nm) | Cone cell death (%) |
|---|---|
| 390 | 0 |
| 400 | 8.2 |
| 410 | 22 |
| 420 | 41.7 |
| 430 | 79.6 |
| 440 | 94.2 |
| 450 | 70.5 |
| 460 | 82.8 |
| 470 | 64.9 |
| 480 | 20.8 |
| 490 | 21.9 |
| 500 | 26 |
| 510 | 89.6 |
| 520 | 67.6 |
| 630 | 0 |

Choice of a Filter

From current transmitted light on cone cells (cf table 5), the light hazard on cones and LHC (table 4), a real life cone cell death (table 7) over 1 week for a fixed $t_{daylight}$ and a fixed toxic threshold TH can be calculated according to Math. 6.

The objective is to obtain cell death value with a filter less than the predefined maximum threshold. Three different cases are described below.

A first case concerns a very bright sunny day, during Summer, in Paris, at the 5th floor of an office building. Thus, the user is exposed to a prolonged light exposure.

$t_{daylight}$ is equal to 50 h (very high exposure to bright light/extreme situation).

A predefined maximum threshold is chosen, by an algorithm, a professional healthcare as an ophthalmologist or an optician. In this case of this example, TH=20%.

It is obtained: CELL DEATH=48%>TH.

Thus, there is a strong need to protect the cones in this situation of prolonged bright light exposure.

With a longpass filter that cuts all the wavelengths below 445 nm, cell death can be reduced close to 20%, which is the defined toxic threshold, which gives a protection factor of the lens close to 1.

A second case concerns a very cloudy Winter day, in Paris, at the 1st floor in a small street. Thus, the user is exposed to a prolonged light exposure $t_{daylight}$ is equal to 50 h (prolonged light exposure).

A predefined maximum threshold is chosen, by an algorithm, a professional healthcare as an ophthalmologist or an optician. In this case of this example, TH=20%.

It is obtained: CELL DEATH close to 0%<TH.

Thus, there is no need for an extra cone cells protection.

A third case concerns a very bright sunny day, in Spring, in Paris, at the 5th floor of an office building. Thus, the user is exposed to moderate light exposure.

$t_{daylight}$ is equal to 10 h (moderate light exposure)

A predefined maximum threshold is chosen, by an algorithm, a professional healthcare as an ophthalmologist or an optician. In this case of this example, TH=10%

It is obtained: CELL DEATH=14%>TH.

Here, there is a need for a cone protection. It is easily to protect the eye cone cells and mitigate cell death under TH thanks to a bandstop or a longpass filter.

INDUSTRIAL APPLICABILITY

The invention can be used in ophthalmic companies, construction companies, car companies, glass maker companies and optic and photonic industries.

The invention is not limited to the eye cone protecting filter and methods associated described here, which are only examples. The invention encompasses every alternative that a person skilled in the art would envisage when reading this text.

REFERENCE SIGNS LIST

10: transparent surface
11: outer surface
12: inner surface
20: sensor
30: user age
40: active matrix
50: darkening tint

The invention claimed is:

1. An eye cone cells protecting filter, intended to be applied to at least one transparent surface, to filter incident light on said transparent surface, for preventing eye cone cells of a user, from damages due to illumination at physiological light levels on the eye of said user, and having spectral characteristics to:
   filter light wavelengths between 405 and 465 nanometers; and
   transmit a filtered light reaching the eye cone cells and having a harmfulness on said eye cone cells under a predefined maximum threshold, said predefined maximum threshold being determined based on a tolerated level of light hazard on cone cell (LHC) parameter;
wherein the eye cone cells protecting filter further comprises:
   an active matrix for filtering incident light on said transparent surface;
   an input for receiving measurements of transmitted light between the transparent surface and the eye
   a processor for computing the spectral characteristics of the eye cone cells protecting filter on the basis of at least:
      said transmitted light measurements; and
      said predefined maximum threshold, and for controlling the active matrix to filter incident light on the basis of said computed spectral characteristics.

2. The eye cone cells protecting filter according to claim 1, wherein said spectral characteristics comprise a filtering peak between 425 and 445 nanometers.

3. The eye cone cells protecting filter according to claim 1, wherein said spectral characteristics comprise a filtering peak between 425 and 445 nanometers, and the active matrix comprises an electrochromic material.

4. The eye cone cells protecting filter according to claim 1, wherein the filter is applied as a darkening tint to said transparent surface and is configured to absorb a fixed proportion of incident light.

5. A method for computing spectral characteristics of an eye cone cells protecting filter according to claim 4, comprising:
   a') obtaining, for a solar incident light and within at least one predetermined wavelengths range, a light hazard on cone cells (LHC) defined by a percentage of eye cone cells death relatively to a solar incident light dose;
   b') estimating a light dose on the eye, due user's data, within said predetermined wavelengths range and during a predefined time;
   c') estimating, on the basis of said estimated light dose, a current cell death hazard percentage within said given time range; and
   d') if said current cell death hazard percentage is above said predefined maximum threshold, computing said spectral characteristics to lower said current transmitted light until the current cell death hazard percentage is below said predefined maximum threshold.

6. A computer program for computing spectral characteristics of an eye cone cells protecting filter according to claim 4, the computer program comprising instructions codes for performing a method for computing spectral characteristics of an eye cone cells protecting filter, comprising:
   a') obtaining, for a solar incident light and within at least one predetermined wavelengths range, a light hazard on cone cells (LHC) defined by a percentage of eye cone cells death relatively to a solar incident light dose;
   b') estimating a light dose on the eye, due user's data, within said predetermined wavelengths range and during a predefined time;
   c') estimating, on the basis of said estimated light dose, a current cell death hazard percentage within said given time range; and
   d') if said current cell death hazard percentage is above said predefined maximum threshold, computing said spectral characteristics to lower said current transmitted light until the current cell death hazard percentage is below said predefined maximum threshold;
when the instructions are run by a processor.

7. The eye cone cells protecting filter according to claim 1, wherein said predefined maximum threshold is determined on the basis of at least one element among:
   a type of activity of the user;
   physiological parameters of the user;
   an age of the user; and
   an average dose of light to which said user is exposed.

8. The eye cone cells protecting filter according to claim 1, configured to absorb a proportion of incident light higher than 99% at wavelengths below a critical wavelength.

9. The eye cone cells protecting filter according to claim 8, wherein the critical wavelength is between 425 nanometres and 445 nanometres.

10. The eye cone cells protecting filter according to claim 1, wherein said predefined maximum threshold is determined further to limit a power density to 0,2 mW/cm² of light reaching the eye cone cells.

11. A method for computing spectral characteristics of an eye cone cells protecting filter according to claim 1, comprising:

a) obtaining, for a solar incident light and within at least one predetermined wavelengths range, a light hazard on cone cells (LHC) defined by a percentage of eye cone cells death relatively to a solar incident light dose;

b) measuring an irradiance of a current transmitted light between the transparent surface and the eye, within said predetermined wavelengths range, and estimating, on the basis of said transmitted light measurements, a current cell death hazard percentage;

c) if said current cell death hazard percentage is above said predefined maximum threshold, computing said spectral characteristics to lower said measured transmitted light; and repeating b) and c) until the current cell death hazard percentage is below said predefined maximum threshold.

12. The method according to claim 11, wherein said current transmitted light is determined within a plurality of successive wavelengths ranges, and said current cell death hazard percentage is given by a sum of current transmitted light intensities in each of said wavelengths ranges multiplied by said light hazard on cone cells (LHC).

13. The method according to claim 11, wherein said current transmitted light is determined within a plurality of successive wavelengths ranges, and said current cell death hazard percentage is given by a sum of current transmitted light intensities in each of said wavelengths ranges multiplied by said light hazard on cone cells (LHC), and wherein said spectral characteristics are given by a light transmission rate $Tlens(\lambda)$ defined, for each of said successive wavelengths ranges ($\lambda$), by:

$Tlens=TH/CD$, where:

TH is the predefined maximum threshold; and

CD is the current cell death hazard percentage.

14. A computer program for computing spectral characteristics of an eye cone cells protecting filter according to claim 1, the computer program comprising instructions codes for performing a method for computing spectral characteristics of an eye cone cells protecting filter, comprising:

a) obtaining, for a solar incident light and within at least one predetermined wavelengths range, a light hazard on cone cells (LHC) defined by a percentage of eye cone cells death relatively to a solar incident light dose;

b) measuring an irradiance of a current transmitted light between the transparent surface and the eye, within said predetermined wavelengths range, and estimating, on the basis of said transmitted light measurements, a current cell death hazard percentage;

c) if said current cell death hazard percentage is above said predefined maximum threshold, computing said spectral characteristics to lower said measured transmitted light; and repeating b) and c) until the current cell death hazard percentage is below said predefined maximum threshold;

when the instructions are run by said processor.

* * * * *